United States Patent [19]
Widstrand

[11] 3,783,318
[45] Jan. 1, 1974

[54] LAMINATED STATOR CORE FOR DYNAMOELECTRIC MACHINES

[75] Inventor: John C. Widstrand, Wausau, Wis.

[73] Assignee: Marathon Electric Manufacturing Corporation, Wausau, Wis.

[22] Filed: Oct. 6, 1972

[21] Appl. No.: 295,706

[52] U.S. Cl. .............................. 310/216, 310/254
[51] Int. Cl. ........................................... H02k 1/16
[58] Field of Search ........... 310/216–218, 254, 258, 310/259, 89, 179, 180, 198, 190, 193, 192

[56] References Cited
UNITED STATES PATENTS

| | | | |
|---|---|---|---|
| 3,671,790 | 6/1972 | Widstrand | 310/216 |
| 1,158,495 | 11/1915 | Hellmund | 310/258 X |
| 2,818,515 | 12/1957 | Dolenc | 310/217 X |
| 1,173,089 | 2/1916 | Bergman | 310/259 |
| 1,882,487 | 10/1932 | DuPont | 310/217 X |

FOREIGN PATENTS OR APPLICATIONS

| | | | |
|---|---|---|---|
| 1,212,622 | 3/1966 | Germany | 310/217 |
| 469,436 | 7/1937 | Great Britain | 310/258 |

*Primary Examiner*—D. F. Duggan
*Attorney*—Ira Milton Jones

[57] ABSTRACT

A stator core for an induction-run motor comprises identical laminations. Each has a circular inner edge to which winding slots open. The outer edge is asymmetrical, defined by arcuate portions curved on a uniform radius concentric to the inner edge, peripherally alternating with straight portions that are parallel to mutually perpendicular lines through the center of the inner edge. Along the stator the laminations have different angular orientations, but orientations differ by uniform angular increments and preferably vary in a regular sequence along the core; hence the core as a whole is symmetrical.

6 Claims, 6 Drawing Figures

LAMINATED STATOR CORE FOR DYNAMOELECTRIC MACHINES

This invention relates to the stator cores of dynamoelectric machines, and more particularly to laminated stator cores upon which the windings of induction-run motors are wound.

While the present invention is not limited in its applicability to induction-run motors, nor, indeed, to motors, as distinct from other dynamoelectric machines, the invention is herein discussed and described with particular reference to induction-run motors.

Conventionally the stator cores of induction-run motors are built up from identical laminations punched out of sheet-like stock. The cost of the core obviously includes not only the cost of those portions of the lamination stock that go into the laminations themselves, but also the cost of those other portions of it that must be discarded as waste trimmings.

Where a multiplicity of identical units are to be punched or stamped from sheet stock, best economy of material is obtained if the units are made as nearly square or rectangular as possible. The stator core of a motor, however, tends to be cylindrical; hence stator laminations have ordinarily been circular or near circular in outline, and their production has heretofore entailed a substantial amount of scrap material. To some extent waste could be minimized by using sheet stock having a width equal to several times the lamination diameter, and punching the laminations out of the stock in a nested or honeycomb-like pattern. However this required a very expensive multiple or "nested" die, the cost of which could be justified only by material savings achieved over a long production run.

With these considerations in mind, it is a general object of the present invention to provide a stator core for induction motors and the like, which core comprises a stack of identical laminations that can be economically punched or otherwise formed out of conventional lamination stock with the use of a single progressive die and with minimum wastage of the material, without however requiring any sacrifice of economy or efficiency in other steps in the manufacture of the motor comprising such laminations, and also without the slightest sacrifice of any desirable characteristic of the finished motor itself.

U.S. Pat. No. 3,671,790 discloses a two-pole induction-run motor having stator core laminations which are generally rectangular in outline, but with rounded corners. The laminations for that motor can be made with a minimum of scrap, but the stator core into which they are assembled according to the teachings of that patent is somewhat conventional, being intended for a motor that has an unusually low shaft height and an unusually low overall height in relation to the power it develops. While remarkably efficient for its size and shape, the motor of that patent nevertheless involves at least a small sacrifice of performance and requires some care in design to avoid more than a negligible sacrifice of efficiency, inasmuch as its stator core is asymmetrical relative to a horizontal plane that contains the equator between its running poles. Specifically, having regard to one of the identical substantially rectangular laminations that are stacked to provide the stator core of that motor, the longer straight sides of that lamination are at its bottom and its top, and the bottom one is closer to the rotor axis than the top one, so that the bottom running pole comprises substantially less core metal than the top one. In thus achieving low shaft height, a motor having such stator core laminations presents the problem that the bottom portion of its core is subject to high magnetic densities and hence to possible magnetic saturation. As explained in the patent, the windings for the two-running poles can be different, to accommodate the different volumes of core metal that they embrace, but this implies that special attention be given to the bottom windings. Thus the particular motor of that patent, notwithstanding the relatively low cost of its individual stator core laminations, is not competitive on a cost-per-horsepower basis with general utility motors that do not require unusually low shaft height.

Another object of the present invention is to provide a more conventional motor than that of the above mentioned patent, having a stator core which is symmetrical to all planes lying on the rotor axis, and therefore having symmetrical running poles as well as being adapted for running pole windings which present no special design problems, which more conventional motor nevertheless has its stator core made up of the asymmetrical laminations of that low shaft height motor, thus enabling one and the same inexpensive lamination to be used for the core of either type of motor so that cost benefits accrue to both.

In short, therefore, it can be said to be another object of this invention to impart versatility to the stator core lamination disclosed in U.S. Pat. No. 3,671,790, so that it can be incorporated into two rather unlike types of motors.

Another object of this invention is to provide a stator core that is relatively inexpensive by reason of the fact that its component laminations have straight outer edge portions and are asymmetrical, but which stator core can nevertheless have a generally cylindrical outer surface that is concentric to its axis.

The last stated object of the invention is of importance with respect to motors having a conventional cylindrical frame or shell that surrounds the stator core. The frame serves to pilot the end bells of the motor, in which the shaft bearings are secured. If the stator core is asymmetrical, or departs too greatly from having a fully cylindrical exterior surface (i.e., has excessive flat areas), it tends to force the frame out of round when it is inserted into the frame, with the result that the frame cannot properly cooperate with the end bells to assure concentricity of the bearings.

Thus it can be said to be another object of this invention to provide a stator core comprised of a stack of identical laminations that can be made economically by reason of the fact that they are individually asymmetrical, with straight edge portions, but which stator core nevertheless has no tendency to force a cylindrical motor frame out-of-round when it is inserted into the frame, to avoid problems in securing end bells to the frame with their shaft bearings in concentric relation.

Still another object of this invention is to provide a laminated stator core which is lower in cost than heretofore conventional equivalent stator cores, and which in no wise impairs the quality of the motor that incorporates it but may in many cases afford advantages with respect to motor cooling.

Another object of this invention is to achieve overall cost savings in the production of induction-run motors and similar machines by reason of reducing the amount of metal in their stator cores without any sacrifice in performance, and thereby effecting economies not only in the material comprising the motor cores but also in the heat treating equipment needed for processing core laminations at a given rate, and even in cost of shipping the finished motors by reason of their somewhat reduced weight.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which.

Figure 1:
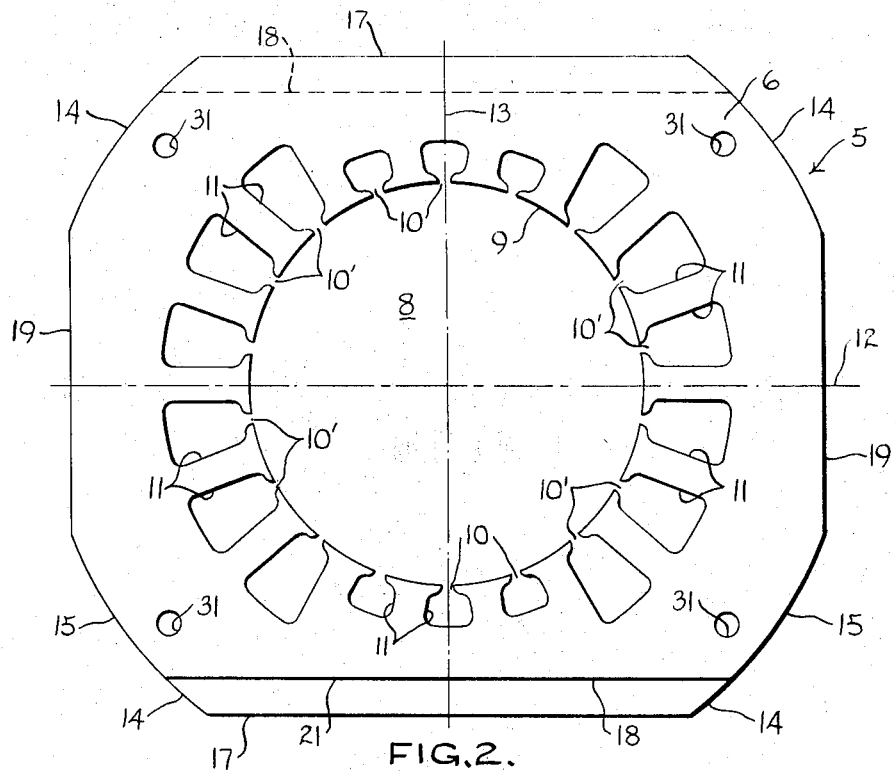
FIG. 1 is an end view of a stator core embodying the principles of this invention.
Figure 2:
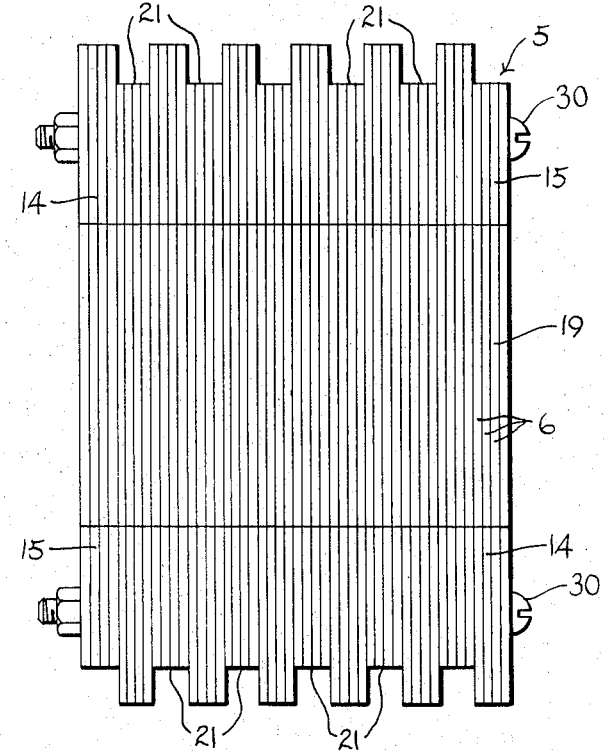
FIG. 2 is a view in side elevation of the stator core shown in FIG. 1.

Referring now to the accompanying drawings, and particularly to the embodiment of the invention disclosed in FIGS. 1 and 2, a stator core 5 embodying the principles of this invention comprises a stack of laminations 6, all of them identical with the laminations disclosed in the above mentioned U.S. Pat. No. 3,671,790. Thus each lamination is substantially octagonal in outline and has an opening 8 that is defined by a circular inner edge 9. In the stack that comprises the core 5, the circular edges 9 of the several laminations are concentric with one another to define a bore in which a rotor (not shown) is received. The center of the circular edge 9 in each lamination of course coincides with the rotor axis.

At circumferentially spaced intervals the circular edge 9 is interrupted by inwardly opening slots 10 and 10', as is conventional in induction motor stator core laminations. In the core stack these slots register with one another to provide grooves 11 in which stator windings (not shown) are received. The slots in each lamination are arranged symmetrically to a pair of mutually perpendicular lines 12 and 13 which intersect at the center of the circular edge 9. In the assembled core the lines 12 for the several laminations define an equatorial plane between a pair of running poles, and the lines 13 define an equatorial plane between starting poles. As shown, three slots, designated 10, are equispaced to opposite sides of the line 12 and are symmetrical to the line 13, which slots are of lesser depth than the remaining slots 10' since they receive only starting windings. The larger slots 10', which are equispaced from the line 13 and symmetrical to the line 12, accommodate both running and starting windings. Further details concerning the arrangement of the respective windings relative to the several slots, and the poles defined by the windings, can be obtained from the above mentioned U.S. Pat. No. 3,671,790.

The generally octagonal outline of each lamination is defined by straight edge portions 17, 18 and 19 alternating around its periphery with arcuately curved edge portions 14 and 15. The arcuate edge portions 14 and 15 are all curved on a uniform radius concentric to the circular inner edge 9, and it will be noted that these arcuate edge portions are of somewhat lesser circumferential extent than any of the straight edge portions, so that the outline of the lamination could be regarded as a rectangle with clipped or rounded corners.

The lamination has two longer straight edge portions 17 and 18 which are parallel to the line 12, and two shorter straight edge portions 19 which are parallel to the line 13. The shorter straight edges 19 are equidistant from the reference line 13, and the lamination is symmetrical to that line; but it is asymmetrical to the line 12 in that the long straight edge 17 is farther from that line than its opposite edge 18. In consequence, the straight edge 18 is longer than its opposite straight edge 17, and the arcuate edge portions 15 that are adjacent to the longest straight edge 18 are of somewhat lesser circumferential extent than the other two arcuate edge portions 14.

Nevertheless, the stator core 5 that is formed from such laminations is symmetrical to both of the planes defined by the lines 12 and 13 by reason of the fact that half of the laminations in the core have their longest straight edges 18 at one side of the core, while the other half of the laminations have their corresponding straight edge portions at the diametrically opposite side of the core, and the differently oriented laminations alternate axially along the core in a regular sequence. This is to say that in the core certain of the laminations have their straight edges 18 adjacent to the straight edges 17 of other laminations.

As shown in FIG. 2, the laminations are arranged in the core in groups, each group containing the same number of flatwise contiguous laminations as all the other groups, with all of the laminations in each group identically oriented; and the laminations of each group are oriented at 180° to the laminations of its adjacent groups. Obviously the laminations could be stacked with every lamination oriented oppositely to its flatwise contiguous laminations.

Because the winding slots 10 and 10' in the laminations are symmetrical to the planes defined by lines 12 and 13, those slots define perfectly straight and regular winding grooves 11 in the core, notwithstanding the different orientations of the laminations along the core. The winding grooves are thus well adapted to accommodate symmetrical windings.

As a result of the described arrangement of the laminations in the core, the external surface of the core has circumferentially extending flat-bottomed grooves 21 therein. However, these grooves are at uniform intervals around and along the core and are symmetrical to the planes defined by the lines 12 and 13; hence the core metal is in all respects symmetrical to the motor poles. Furthermore, despite the saving in lamination stock that is effected by reason of the edge portion 18 of each lamination being straight and relatively close to the circular inner edge 9, there is adequate metal all around the core to avoid zones of high magnetic density. In effect, where a straight edge portion on one lamination may tend to create a zone of magnetic saturation, the excess flux simply moves over into neighboring differently oriented laminations.

Note, too, that by reason of the lamination arrangement, the curved exterior surface portions of the core, considered as a whole, have a greater circumferential extent than the arcuate edge portions of an individual lamination. In other words, the exterior surface of the core more nearly approaches a cylinder than the outline of an individual lamination approaches a circle. Hence the economy of lamination material achieved by the nearly rectangular configuration of the individual laminations does not result in a correspondingly great tendency to cause out-of-roundness of a motor frame into which the core is inserted.

The grooves 21 that appear in the external surface of the core tend to improve motor performance by promoting better cooling than would be attainable without them. In drip-proof motors with frames and straight through cooling, the grooves 21 make for better cooling by reason of the greater exposure of lamination area to cooling air; and in totally enclosed motors the grooves 21 enhance cooling effect by affording more effective distribution of contact area between the stator core and the frame and by defining increased heat radiation and convection areas on the core.

Figure 3:
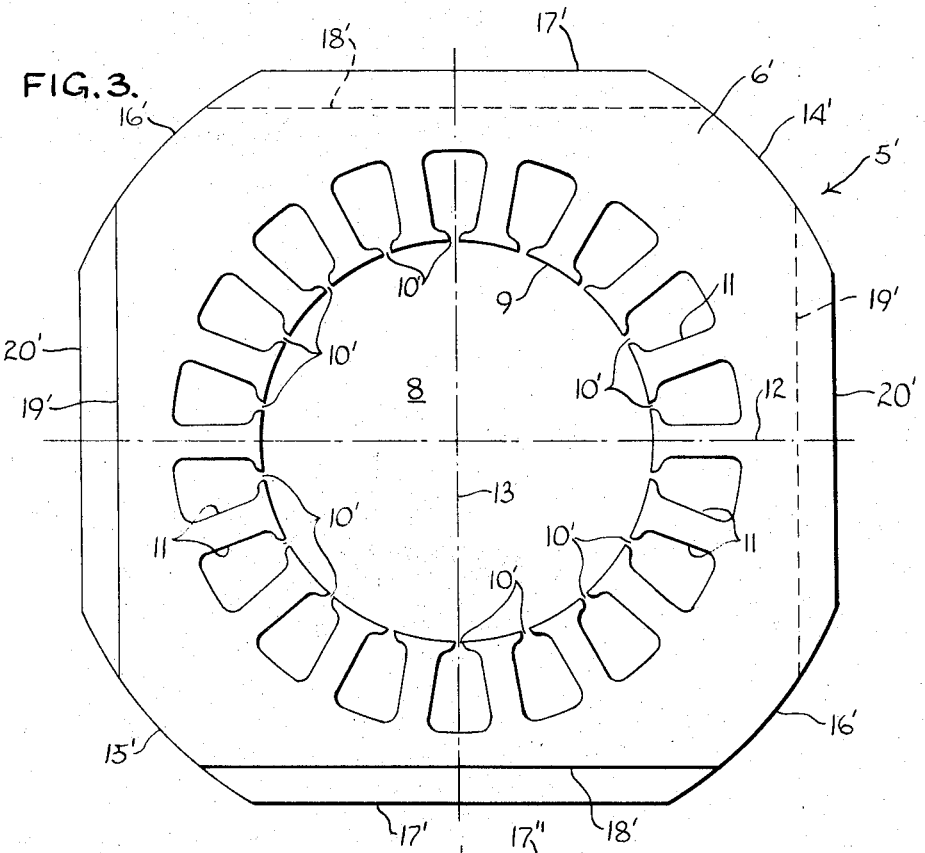
FIGS. 3 – 6 are end views of variously modified forms of stator cores embodying the invention.

FIG. 3 illustrates a core 5' which provides slightly better rounding out of a rolled steel frame than the core of FIGS. 1 and 2. Like the latter, the core 5' of FIG. 3 is comprised of identical laminations 6', each having an opening 8 defined by a circular inner edge 9, with equi-spaced slots 10 opening inwardly thereto. In this case the winding slots are all of the same size, but, as is usually the case in conventional induction-run machines, they are arranged symmetrically to mutually perpendicular lines 12 and 13 through the center of the opening, which lines define the equatorial planes between the poles of the motor.

The core 5' is generally similar to the core 5, too, in that each of its laminations 6' has a more or less octangonal outline defined by straight edge portions 17', 18', 19' and 20', alternating around the periphery with arcuate edge portions 14', 15' and 16' that are curved on a uniform radius about the center of the inner edge 9. However, as compared with the above described lamination 6, the arcuate outer edge portions of the lamination 6' have, in total, a somewhat greater circumferential extent; the straight edge portions 17' – 20' more nearly define a square than a rectangle; and the lamination 6' is asymmetrical to both of the reference lines 12 and 13. Specifically, of the opposite straight edge portions 17' and 18' that are parallel to the line 12, the edge 18' is closer to the line 12 (and hence longer) than edge 17'; and the straight edge portion 19', which parallels the line 13, is closer to that line (hence longer) than its opposite straight edge 20'. However, the two longer straight edges 18' and 19' are preferably of equal length, as are the two shorter straight edges 17' and 20'. The two opposite arcuate edge portions 16' that extend between longer and shorter straight edges are of equal circumferential extent; the arcuate edge 15' that connects the two longer straight edges is of lesser circumferential extent; and its opposite arcuate edge 14' has the greatest circumferential extent. The line of symmetry is at 45° to the reference lines 12 and 13 and extends through arcuate edges 14' and 15'. (Note that in all instances the term "symmetry" is used herein to denote mirror-image or "flipped" symmetry as well as true symmetry.)

As in the FIGS. 1 and 2 embodiment, the laminations 6' are arranged in the core 5' in a regularly alternating sequence, with half of the laminations of the core shown oriented 180° from the other half. However, it will be apparent that the angular orientations of the several laminations could be varied in many different ways. For example, each lamination could be displaced rotationally by one or two slots from its adjacent laminations since the slots are of uniform size and uniformly spaced.

Where core laminations are held assembled by through bolts 30 passing through holes in the laminations, the bolt-receiving holes must of course be arranged symmetrically to the equatorial lines 12 and 13, as with the bolt receiving holes 31 in FIG. 1. In such cases the arrangement of the bolt receiving holes requires laminations to be oriented at either 90° or 180° to one another. A wider variety of orientations is possible where laminations are secured together by welding.

In most cases, for every lamination (or nearly every lamination) that is oriented in one direction, there will be another that is at 180° to it; and in all cases the sequence in which the orientation of laminations is varied along the stack is preferably a regular one, to provide overall symmetry of the core.

Because of the four straight edge portions on the lamination 6', arranged in a nearly square configuration, such laminations can be punched out of lamination stock with very little waste material, yet the core that they cooperate to form has an overall exterior surface defining a substantially large portion of a full cylinder and thus has little tendency to impart out-of-roundness to a rolled steel frame into which it is inserted, as well as providing symmetrical motor poles with no magnetic constriction. It will be apparent that the external surface of the core 5' defined by the laminations 6' will have regularly distributed flat-bottomed grooves that are generally similar to the grooves 21 previously described, and which will afford the same motor cooling advantages.

Figure 4:
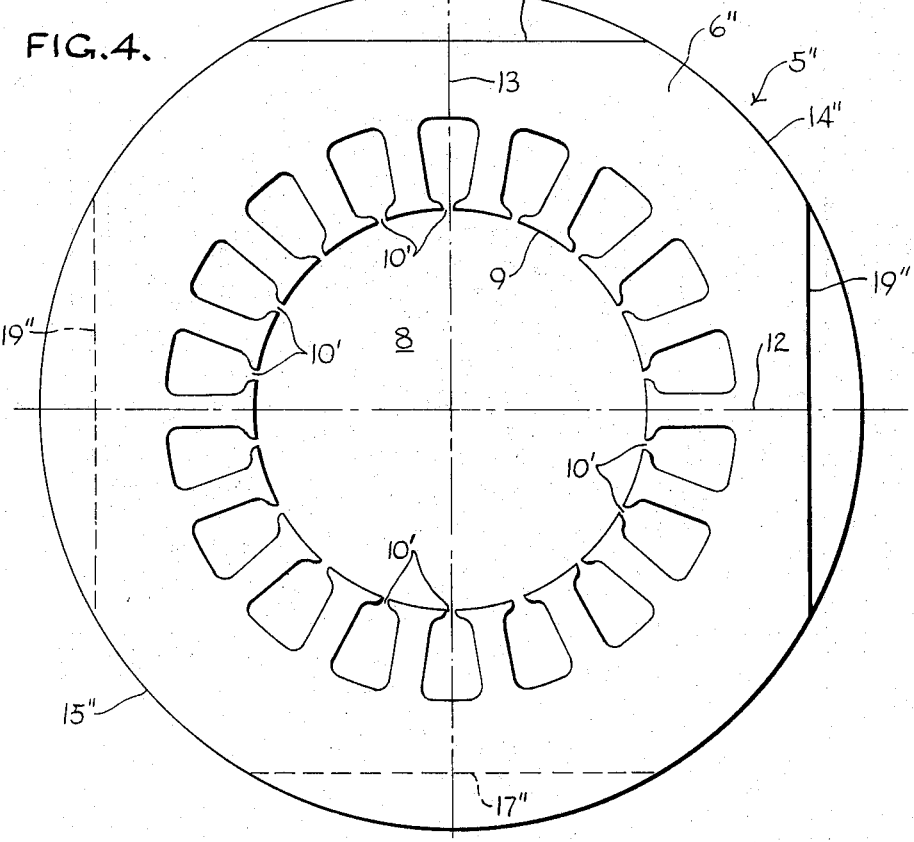

The core 5" that is illustrated in FIG. 4, which comprises a stack of identical laminations 6" of further modified form, has a full and true cylindrical exterior surface overall, interrupted, however, by flat-bottomed grooves at regular intervals around and along it, corresponding to the grooves 21 previously described. The core 54" will thus afford complete assurance that roundness will be maintained in a frame into which it is inserted, will have the motor cooling advantages mentioned above, and will at the same time be lower in cost than a core made of heretofore conventional round laminations, owing to savings in lamination material scrap.

As with the laminations previously described, each of the laminations 6" has an opening 8 defined by a circular inner edge 9, with slots 10 that open inwardly thereto, arranged symmetrically to mutually perpendicular lines 12 and 13 that intersect at the center of the inner edge. And again, each lamination 6" has an outer edge consisting of straight edge portions 17" and 19" which alternate circumferentially with arcuate edge portions 14" and 15" that are curved on a uniform radius concentric to the inner edge. In this case, however, there are only two straight edge portions — one of them (designated 17") parallel to the line 12, the other (19") parallel to the line 13; and likewise there are only two arcuate edge portions. Preferably the two straight edge portions are at equal distances from the center of the inner edge 9, so that a line of symmetry at 45° to the lines 12 and 13 extends through said center and through both arcuate edge portions.

In this case, again, half of the laminations 6'' in the core 5'' are shown oriented at 180° to the other half of the laminations, but other schemes of varying the lamination orientation along the core can be used, as explained above.

Figure 5:
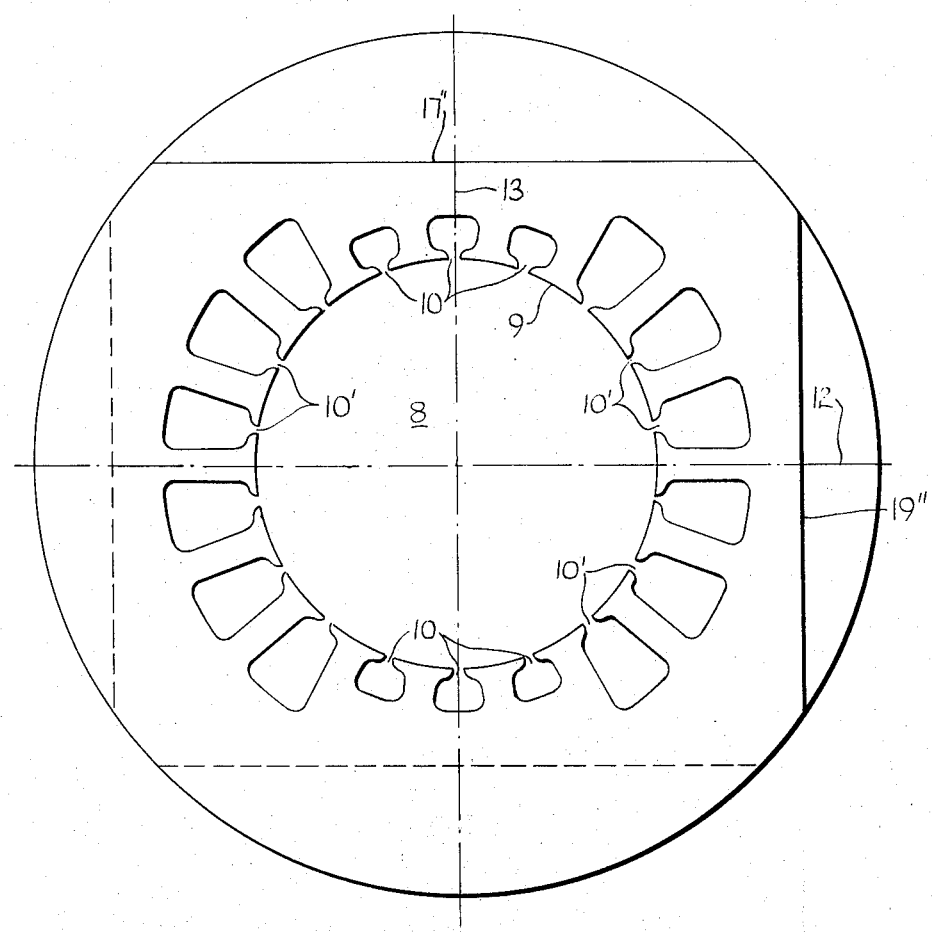

FIG. 5 illustrates a core comprising identical laminations, each having an arrangement of small and large slots 10 and 10' like that of the laminations of FIG. 1, but having an outside edge somewhat similar to that on the laminations of FIG. 4. The FIG. 5 laminations differ from those of FIG. 4 in that each of the FIG. 5 laminations has one of its straight outer edge portions 17'' closer to the center of its circular inner edge than its other straight edge portion 19'', thus taking full advantage of the lesser depth of the upper slots 10. The laminations of the FIG. 5 embodiment vary in their orientations along the stator in the manner described in connection with FIGS. 1 and 2.

Figure 6:
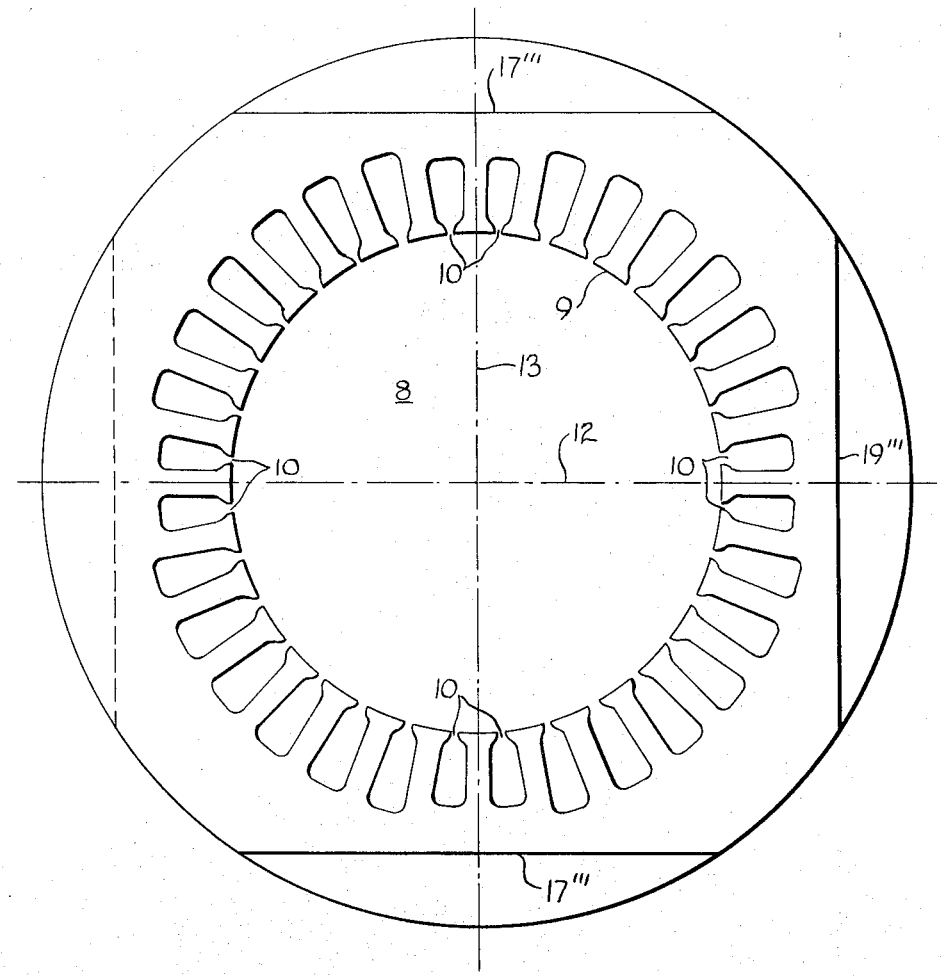

FIG. 6 illustrates an embodiment of the invention in which each lamination has three straight outer edge portions, two of which — designated by 17''' — are at opposite sides of the lamination and parallel to the equatorial line 12 and the third of which — designated 19''' — is perpendicular to the other two. All three straight edge portions are at the same distance from the center of the inner circular edge 9. In this case the stator is shown as having 32 winding slots, to provide a four-pole induction run motor, including a pair of smaller slots 10 in each quadrant, with the two slots of each such pair on opposite sides of one of the equatorial lines 12 and 13. The straight edge portions are relatively close to the center of the inner edge, to take full advantage of the small slots and achieve maximum economy of lamination stock.

In this case the laminations along the length of the stator have four different orientations, and the different orientations differ from one another by multiples of 90°. It will be apparent that generally the same lamination configuration and orientation arrangement could be used if all winding slots were of the same size.

From the foregoing description taken with the accompanying drawings it will be apparent that the present invention provides a stator core for induction-run motors and similar dynamoelectric machines, which core is completely symmetrical to all planes lying on its axis and has sufficient cylindrical surface area to assure maintenance of roundness of a frame into which it is inserted, but which core is nevertheless comprised of laminations that are asymmetrical and have straight outer edge portions so that they can be made with less waste of lamination stock than heretofore conventional symmetrical laminations.

Those skilled in the art will appreciate that the invention can be embodied in forms other than as herein disclosed for purposes of illustration.

The invention is defined by the following claims:

1. A stator core for a dynamoelectric machine, having slots which open radially inwardly to a circular bore and in which windings can be received to produce a pair of starting poles and a pair of running poles, the poles of each pair being disposed at opposite sides of one of a pair of mutually perpendicular diametral planes that lie on the axis of the bore, said core comprising flatwise superimposed laminations, and the laminations being characterized by:
    A. each lamination having
        1. a substantially circular inner edge,
        2. circumferentially spaced slots of two different radial depths opening to the inner edge, the slots of each depth being arranged in two like groups of circumferentially adjacent slots,
            a. the two groups of slots of smaller depth being at opposite sides of one of a pair of mutually perpendicular straight lines through the center of the inner edge,
            b. the two groups of slots of larger depth being at opposite sides of the other of said lines, and
            c. the two groups of slots of each depth being arranged symmetrically to both of said lines, and
        3. the outer edge of each lamination having straight portions which are parallel to said lines and which peripherally alternate with arcuate portions curved on a uniform radius about said center, a straight portion parallel to said one line being closer to said center than any straight portion parallel to said other line and also being closer to said center than its diametrically opposite outer edge portion so that the lamination is asymmetrical about at least said one line; and
    B. said laminations being flatwise stacked in the core with their circular inner edges concentric and with substantially half of the laminations oriented at 180° to the other half, the orientations of the laminations along the stack varying in a regular sequence.

2. The annular core of claim 1, further characterized by:
    the outer edge of each lamination further having
        1. a second straight portion parallel to said one straight portion and at the opposite side of said one line but spaced a farther distance therefrom, and
        2. further straight portions at both sides of the other of said lines and parallel thereto, both of said further straight portions being spaced a greater distance from said center than either of said first and second straight portions.

3. A laminated substantially annular core for a dynamoelectric machine, having winding slots that open to its inner circumference at spaced intervals therearound, said stator core being characterized by:
    A. substantially all of the laminations that comprise the core being identical, and each having
        1. a substantially circular inner edge,
        2. circumferentially spaced slots opening to said inner edge and arranged symmetrically to a pair of mutually perpendicular lines through the center of said inner edge, and
        3. an outer edge having straight portions peripherally alternating with arcuate portions curved on a uniform radius about said center, there being at least one straight portion parallel to each of said lines and each of said straight portions having a point at its middle that is closer to the line it parallels than the point on the outer edge that is diametrically opposite it, so that the lamination is asymmetrical about both of said lines; and
    B. said laminations being flatwise stacked in the core with their circular inner edges concentric and with substantially half of the laminations oriented at 180° to the other half, the orientations of the laminations along th stack varying in a regular sequence.

4. A stator core for a dynamoelectric machine, having slots which open radially inwardly to a circular bore and in which starting and running windings can be received to produce pairs of diametrically opposite poles, said core comprising flatwise superimposed laminations, and the laminations being characterized by:
  A. each lamination having
    1. a substantially circular inner edge,
    2. circumferentially spaced slots of two different radial depths opening to the inner edge, said slots being arranged in like groups of circumferentially adjacent like slots, there being a group of smaller depth slots at each side of a line through the center of said inner edge and the groups of like slots being arranged symmetrically to said line and to another line that is perpendicular to said one line and extends through said center,
    3. the outer edge of each lamination having straight portions which are parallel to said lines and which peripherally alternate with arcuate portions curved on a uniform radius about said center,
      a. there being two straight portions parallel to the other of said lines and at opposite sides thereof, and
      b. there being at least one other straight portion parallel to the first mentioned line and which is closer to said center than its diametrically opposite outer edge portion so that the lamination is asymmetrical about said one straight line; and
  B. substantially every lamination in the core being oriented edgewise rotationally at 180° to one other lamination so that there is a substantially equal number of laminations at each such orientation.

5. The stator core of claim 4, further characterized by:
  the outer edge portion of each lamination that is diametrically opposite said at least one other straight portion being straight and parallel to said one line and spaced at a greater distance therefrom than said at least one other straight portion but at a lesser distance therefrom than the spacing of said two straight portions from said other line.

6. The stator core of claim 4, further characterized by:
  a. each lamination having four groups of slots of each depth, each group of smaller depth slots being centered on one of said lines, and
  b. the outer edge portion of each lamination that is diametrically opposite said at least one other straight portion being arcuate.

* * * * *